(12) United States Patent
Bockman et al.

(10) Patent No.: US 6,474,675 B1
(45) Date of Patent: Nov. 5, 2002

(54) STABILIZER FOR A MULTI-TRAILER RIG

(76) Inventors: Mark Bockman, P.O. Box 697, Glenrock, WY (US) 82637; Tamera Bockman, P.O. Box 697, Glenrock, WY (US) 82637

( * ) Notice: Subject to any disclaimer, the term of this patent is extended or adjusted under 35 U.S.C. 154(b) by 0 days.

(21) Appl. No.: 09/938,079

(22) Filed: Aug. 24, 2001

(51) Int. Cl.$^7$ ................................................. B60D 1/00
(52) U.S. Cl. ................................. 280/455.1; 267/138
(58) Field of Search ................................. 267/138, 183, 267/195, 71, 72; 180/455.1, 432, 457, 459

(56) References Cited

U.S. PATENT DOCUMENTS

| | | | |
|---|---|---|---|
| 673,879 A | * | 5/1901 | Lawhorn ...................... 278/18 |
| 2,783,039 A | * | 2/1957 | Wilson ........................ 267/138 |
| 3,250,524 A | * | 5/1966 | Boatright ..................... 267/138 |
| 3,825,282 A | | 7/1974 | Meinholdt |
| 3,964,767 A | | 6/1976 | Williams |
| 4,029,307 A | * | 6/1977 | Nielson ....................... 267/138 |
| 4,385,754 A | * | 5/1983 | Waite .......................... 267/71 |
| 4,917,406 A | * | 4/1990 | Herchenbach et al. ...... 172/450 |
| 4,936,710 A | | 6/1990 | Petty et al. |
| 5,222,754 A | | 6/1993 | Few |
| 6,345,583 B1 | * | 2/2002 | Thackston et al. .......... 114/213 |

* cited by examiner

*Primary Examiner*—Avraham Lerner
*Assistant Examiner*—Daniel Yeagley
(74) *Attorney, Agent, or Firm*—Donald R. Schoonover

(57) ABSTRACT

A stabilizer for reducing, if not totally eliminating, swaying, fishtailing and/or jackknifing of a multi-trailer rig includes spring units that can be retrofit onto the rig between a towed unit and another unit towing that towed unit. Each of the spring units is operated by a lever-like pivot handle and the spring units are located on opposite sides of a dolly.

4 Claims, 2 Drawing Sheets

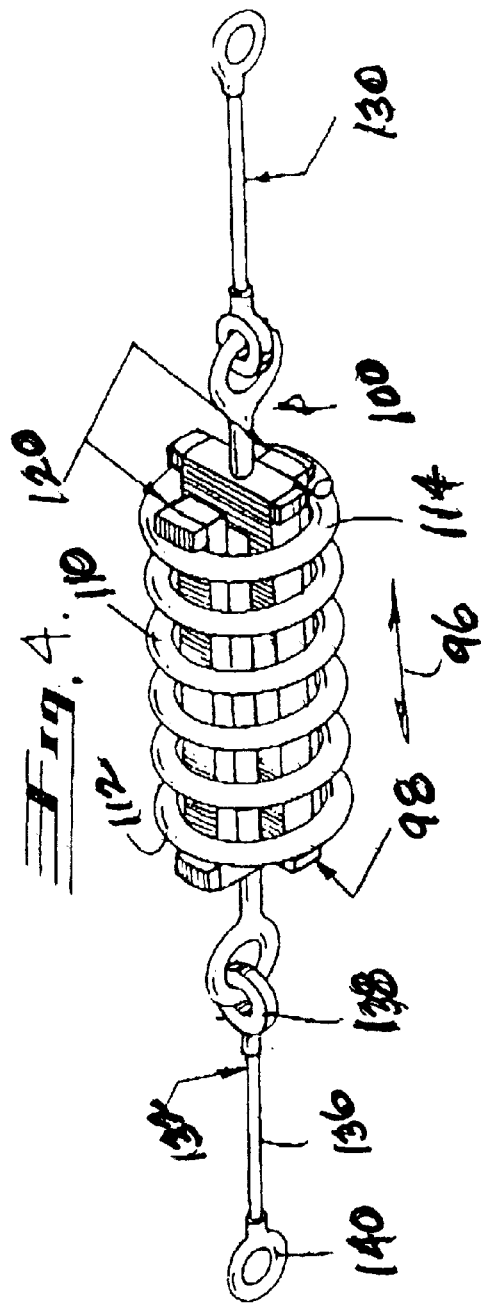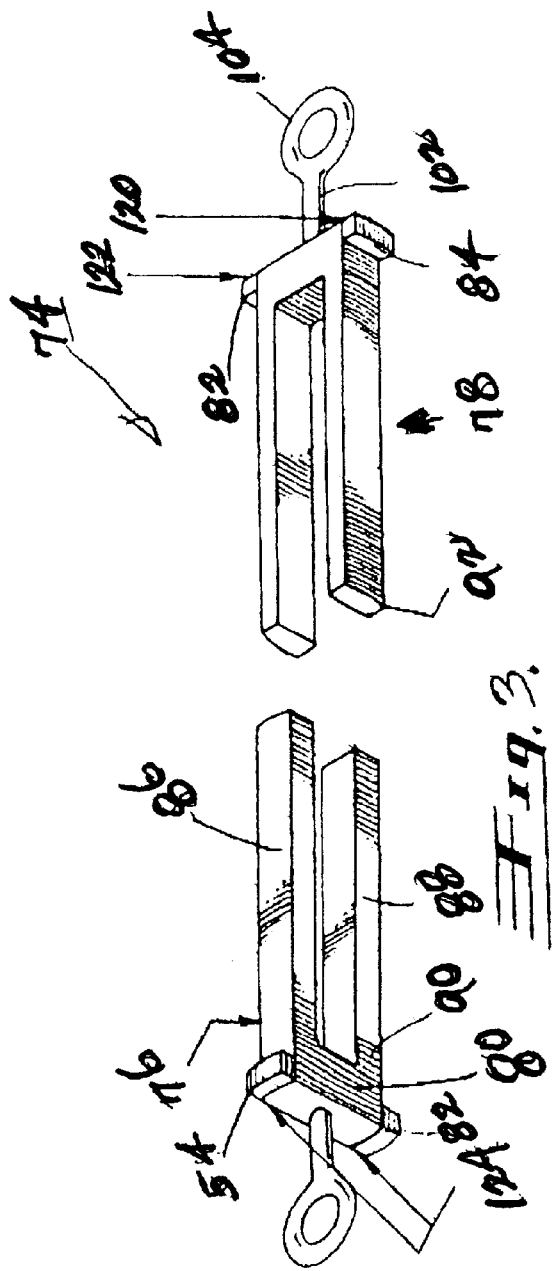

STABILIZER FOR A MULTI-TRAILER RIG

BACKGROUND OF THE INVENTION

1. Field of the Invention

The present invention relates to the general field of land vehicles, and more particularly to anti-sway devices for land vehicles.

2. Discussion of the Related Art

As more cargo is transported via land vehicles, the dangers associated with truck traffic, both to the truckers themselves and to the vehicles that share the roads with these trucks, have increased. These dangers have been further exacerbated in recent times by the trend in the trucking industry to use larger rigs, including those with multiple trailers being towed by a single tractor.

Large rigs, especially rigs with multiple trailers, on tight schedules often are required to operate in areas congested with a great number of small vehicles. The rigs are not nearly as maneuverable as the small vehicles, yet are often required to maneuver in tight quarters almost as though the large rig were as maneuverable as small vehicles. This is a dangerous situation that is made even more dangerous as rigs increase in size.

Accordingly, there is a need for a tractor/trailer rig that is maneuverable. There is a further need for a multi-trailer tractor/trailer rig that is maneuverable.

Still further, large rigs are subject to swaying and fishtailing as a result of road forces and/or wind forces. The swaying can become unstable and dangerous if the rig driver is not extremely skilled and attentive. Again, like the above-discussed maneuverability-related problems, the dangers associated with swaying and/or fishtailing are magnified in multi-trailer rigs.

Still further, the well-known problem of jackknifing is also exacerbated in multi-trailer rigs.

Therefore, there is a need for a stabilizing system that reduces, if not totally eliminates, swaying in tractor/trailer rigs, especially multi-trailer rigs.

The land vehicle art contains disclosures of systems intended to reduce swaying between trailers and the vehicles towing those trailers. The known systems generally include some elements located between the trailers and the towing vehicle. However, most of these elements are complex, difficult and expensive to install. Often, a proper set up may require factory installation. While effective, this may be too expensive or onerous for many rig drivers and/or owners. This is especially true for an existing rig that is being adapted to tow a plurality of trailers.

Therefore, there is a need for a stabilizer system that can be easily, quickly and inexpensively retrofit onto an existing tractor/trailer rig.

Still further, many of the known stabilizer systems are complex enough to be difficult and expensive to maintain and/or service.

Therefore, there is a need for a stabilizer that can be used on a multi-trailer rig and which is easily and inexpensively maintained and serviced.

PRINCIPAL OBJECTS OF THE INVENTION

It is a main object of the present invention to provide a stabilizer for a tractor/trailer rig that makes that rig maneuverable, especially if the rig includes a plurality of trailers.

It is another object of the present invention to provide a stabilizer for a tractor/trailer rig that reduces, if not completely eliminates, swaying between the towed trailers and the towing vehicle, or the trailers towing a particular vehicle in the situation of a multi-trailer rig.

It is another object of the present invention to provide a stabilizer for a tractor/trailer rig that is easily, quickly and inexpensively retrofit onto an existing rig.

It is another object of the present invention to provide a stabilizer for a multi-trailer tractor/trailer rig and which can be easily and inexpensively maintained and/or serviced.

SUMMARY OF THE INVENTION

These, and other, objects are achieved by a stabilizer for use in a tractor/trailer rig that is easily installed, even in a retrofit situation, yet is effective in reducing, if not totally eliminating, swaying, fishtailing, and jackknifing by flexibly, yet securely, connecting a towed vehicle trailer to a vehicle element towing that trailer.

The stabilizer establishes a force couple adjacent to a dolly which tends to dampen out the forces which create an unstable swaying or fishtailing situation. However, the stabilizer is still simple and easy to install, service and modify.

BRIEF DESCRIPTION OF THE DRAWINGS

FIG. 3 is a perspective view of a spring mount used in the stabilizer of the present invention.

FIG. 4 is a spring unit used in the stabilizer of the present invention.

DETAILED DESCRIPTION OF THE INVENTION

Other objects, features and advantages of the invention will become apparent from a consideration of the following detailed description and the accompanying drawings.

The stabilizer embodying the teaching of the present invention is easily installed on an existing rig and is thereafter easily maintained, serviced and/or modified as required.

Figure 1:
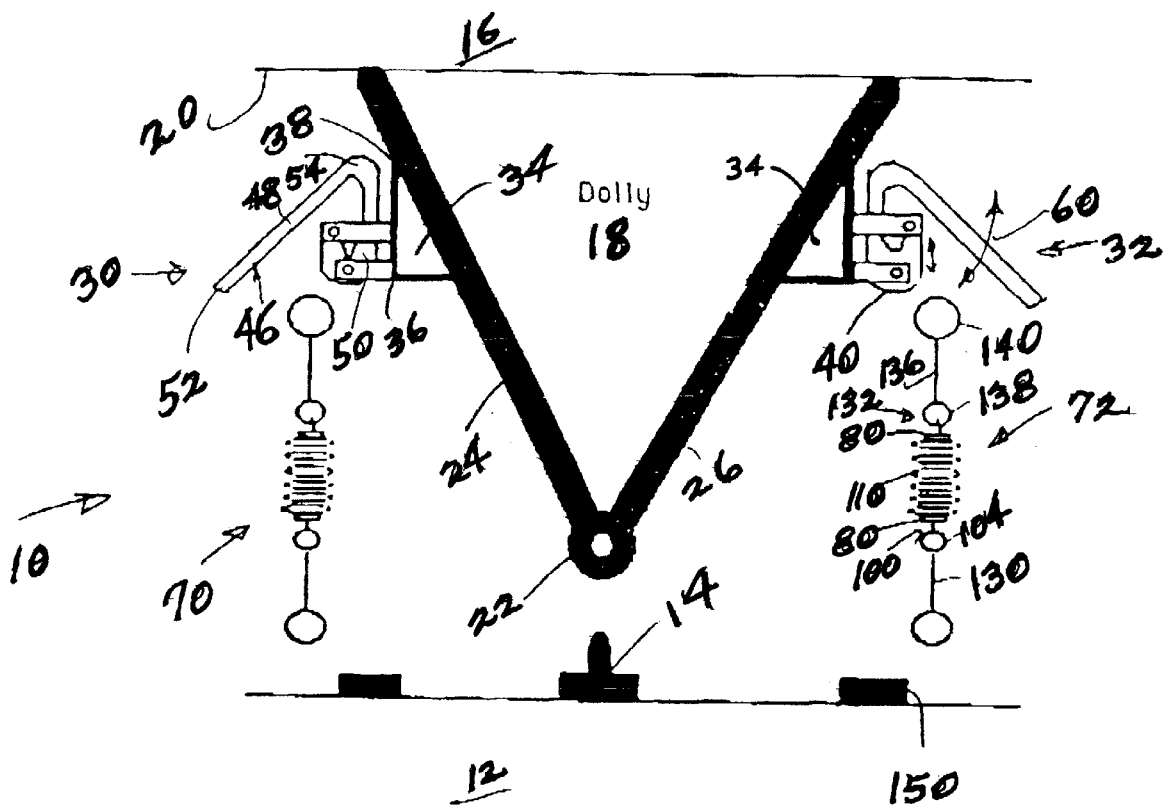
FIG. 1 is a schematic representation illustrating a stabilizer in accordance with the teaching of this disclosure in combination with a trailer and a tractor towing the trailer.
Figure 2:
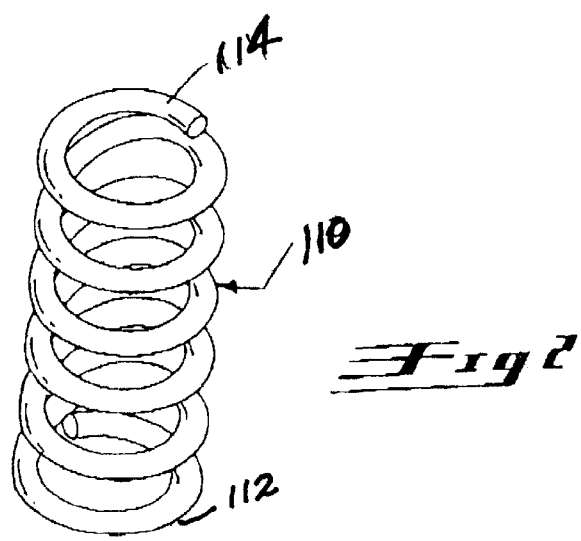
FIG. 2 is a perspective view of a spring that is used in the stabilizer of the present invention.

Referring to FIG. 1, a portion 10 of a tractor/trailer rig is shown as including a towing tractor 12 having a tow hitch 14 thereon and a towed trailer 16 which is pivotally connected to the towing tractor 12 and is thus subject to swaying or fishtailing, especially if towed trailer 16 is one of a plurality of towed trailers.

As is shown in FIG. 1, towed trailer 16 has a dolly 18 thereon, the dolly extending from one end 20 of towed trailer 16 and being in the shape of a triangle to define an apex 22 which is spaced from end 20 of towed trailer 16 and which is pivotally connected to tow hitch 14 of towing tractor 12 when towed trailer 16 is attached to towing tractor 12. It is understood that the description will refer to tractor 12, but it will be understood by those skilled in the art based on the teaching of this disclosure that trailer 16 could be one of a plurality of towed trailers, and thus be attached to a preceding trailer, which, itself could be attached to a towing trailer, and so forth until one trailer is finally attached to the towing tractor 12. As shown in FIG. 1, dolly 18 includes two side edges 24 and 26 which extend between end 20 of towed trailer 16 and apex 22 of dolly 18.

Still referring to FIG. 1, the stabilizer of the present invention further includes two locking units 30 and 32, one on each side edge of dolly 18. The locking units 30 and 32 are essentially identical to each other, and thus the description of one locking unit will be understood as applying to the other locking unit as well. Each locking unit includes a base 34 mounted on an associated side edge 24 or 26 of dolly 18 and includes a forward edge 36 and a rear edge 38.

Each locking unit further includes a pivot handle support 40 slidably mounted on the base 34 associated therewith to be movable from a first position adjacent to forward edge 36 of the base 34 of the respective locking unit and a second position adjacent to the rear edge 38 of the base 34 of the respective locking unit. The movable mounting includes slots defined in base 34 which slidably receive projections from handle support 40. Each locking unit further includes a pivot handle 46 pivotally mounted on the associated pivot handle support 40. Each pivot handle 46 including an L-shaped body 48, a distal end 50 connected to pivot handle support 40 for movement therewith, a proximal end 52, and an elbow 54 located between distal end 50 and proximal end 52. The elbow 54 is located adjacent to base 34 for abutting engagement with that base 34 for a purpose which will be understood from the following disclosure.

The pivot handle 46 is pivotally movable in the directions indicated by double-headed arrow, designated by numeral 60 in FIG. 1, between a first configuration with proximal end 52 spaced from the associated side edge 24 and a second configuration with proximal end 52 located adjacent to the associated side edge. During this pivotal movement, elbow 54 abuttingly engages the associated side edge to define a pivot location about which the pivot handle 46 pivots in moving between the first position of the pivot handle 46 to the second position of the pivot handle 46 whereby the pivot handle 46 acts like an over-center pivot.

The pivot handle 46 is connected to the movable pivot handle support 40 so the pivot handle support 40 is in the first position adjacent to the forward edge 36 of base 34 of the locking unit when the pivot handle 46 is in the first configuration with proximal end 52 spaced from the associated side edge and being moved to the second position adjacent to rear edge 38 of the base 34 of the locking unit when the pivot handle 46 is in the second configuration with proximal end 52 located adjacent to the associated side edge. The pivot handle 46 is shown in the first configuration and the pivot handle support 40 is shown in the first position in FIG. 1.

The stabilizer further includes two spring units 70 and 72. Spring units 70 and 72 are identical to each other, and thus the description of one spring unit will be applicable to the other spring unit as well. Each spring unit connects an associated locking unit, either 30 or 32, to the towing tractor.

As shown in FIG. 3, each spring unit 70, 72 includes a spring mount 74 which includes first and second U-shaped bodies 76 and 78. Each U-shaped body 76 and 78 includes a base 80 having two outer ends 82 and 84 and two spaced apart legs 86 and 88, with each leg having a base end, such as base end 90, fixed to the base 80 of the U-shaped body associated therewith and a distal end 92 spaced from the base of the U-shaped body associated therewith. The base end 90 of each leg is spaced from an outer end 82 or 84 of the base end associated therewith to define a shoulder, such as shoulder 86, adjacent to each base outer end for a purpose that will be understood from the following disclosure.

The first and second U-shaped bodies are shown in FIGS. 3 and 4 to be oriented with respect to each other such that the bases 80 of the U-shaped bodies are oriented at an oblique angle with respect to each other, and preferably at a right angle. As is best seen in FIG. 4, the legs of the first U-shaped body are located between the legs of the second U-shaped body and the legs of the first and second U-shaped bodies are positioned between the bases of the U-shaped bodies. The legs of the U-shaped bodies slidably engage each other as the U-shaped bodies move toward and away from each other in directions indicated by double-headed arrow, designated by the numeral 96 in FIG. 4.

Each U-shaped body further includes a spring supporting foot, such as spring supporting foot 98, on distal end 92 of each leg.

Each spring unit further includes a hook unit 100 fixedly attached to each base 80. Each hook unit 100 includes a body 102 fixed at one end thereof to the base and an eye 104 on the other end of body 102.

As can be seen in FIG. 4, a coil spring 110 surrounds each spring mount. As is shown in FIGS. 3 and 4, each coil spring 110 includes one end 112 positioned to abut the shoulders 86 on both U-shaped body bases, and a second end 114 positioned to abut the spring supporting ends on the legs of the U-shaped bodies as the U-shaped bodies move toward and away from each other as indicated by arrow 96 with the coil spring resisting sliding movement of the two U-shaped bodies. The ends of the spring do not always remain in contact with both the shoulders 86 and the spring supporting ends of the legs but engage an appropriate surface as necessary to resist relative movement of the U-shaped bodies. Thus, for example, if bodies 76 and 78 move away from each other, the spring supporting ends of one body will engage the spring while the shoulders of the other body will engage the opposite ends of the spring, while the opposite will occur when the U-shaped bodies move in the opposite direction. The spring force of spring 110 is selected to control the relative movement of the U-shaped bodies in accordance with the parameters required to control relative movement between tractor 12 and trailer 16 as will be understood by one skilled in the art based on the teaching of the present disclosure.

It is noted that assembly of unit 74 requires that the shoulders 86 or the spring supporting feet be welded in place after the spring is placed around the unit. Thus, welds are indicated in FIGS. 3 and 4, such as welds 120, 122 and 124.

Each stabilizer further includes a first tie element, such as tie element 130, connecting hook unit 100 on the first U-shaped body to the towing tractor 12 and a second tie element, such as tie element 132, connecting the hook unit 100 on the second U-shaped body to the base of an associated one of the locking units and hence to the trailer 16. Each hook unit 100 includes a body 136 having a first eye 138 fixedly connected to an eye on the hook unit 100 on one end thereof and a second eye 140 on the other end thereof for connection to either the tractor 12 or to the movable pivot handle support 40 on the dolly 18 for movement therewith.

As can be understood from the foregoing, as pivot handle 46 is moved from the first configuration shown in FIG. 1 to the second configuration with distal end 52 located adjacent to side edge 24, movable pivot handle support 40 moves from adjacent to front end 36 of the mount to adjacent to rear end 38 of the mount. Since eyes 140 of the hook unit ties are connected to the spring unit and to the tractor and to the trailer, such movement of the pivot handle 46 will attempt to draw the U-shaped bodies away from each other. Such movement will be resisted by spring 110 thus setting a tension on the spring 110 and biasing the tractor 12 toward the trailer 16. The amount of this bias is set by selection of the spring force of spring 110 and by adjusting the amount of movement of the pivot handle 46. The pivot handle 46 need not be in the end positions discussed herein, but can be set in an intermediate position by appropriate locks either on the elbow 54 of the pivot handle 46 or by a special lock element located between the pivot handle 46 and the dolly 18. Appropriate mounts, such as mount 140, can be used to connect the springs to the tractor 12 or to the trailer that is towing trailer 16. Spring mounts 150 can include appropriate hooks to engage the eyes 104 or 140. Eyes 104 and 140 can be welded to the eyes on mounts 150 if suitable, or can simply be held in place by friction.

Once the bias is set on the springs 110, any further movement of the tractor 12 with respect to the trailer 16 will be resisted by the spring units in the manner discussed above. Since the spring units are located on opposite sides of the dolly 18, a force couple will be established about the apex 22 of the dolly 18. This force couple will tend to resist further swaying or fishtailing of the trailer 16 with respect to the tractor 12 and thus will resist swaying and/or fishtailing.

It is understood that while certain forms of the present invention have been illustrated and described herein, it is not to be limited to the specific forms or arrangements of parts described and shown.

We claim:

1. A stabilizer for use with land vehicle rigs in which a towed trailer is pivotally connected to a towing tractor comprising:
   a) a towing tractor having a tow hitch thereon;
   b) a towed trailer having
      (1) a dolly thereon, the dolly extending from one end of said towed trailer and defining an apex which is spaced from the one end of said towed trailer and which is pivotally connected to the tow hitch of said towing tractor when said towed trailer is attached to said towing tractor, the dolly including two side edges extending between said one end of said towed trailer and said apex of said dolly, and
      (2) two locking units, one on each side edge of said dolly, each locking unit including
         (A) a base mounted on an associated side edge of said dolly, sa id base having a forward edge and a rear edge,
         (B) a pivot handle support slidably mounted on said base and movable from a first position adjacent to said forward edge of said base of said locking unit and a second position adjacent to said rear edge of said base of said locking unit, and
         (C) a pivot handle pivotally mounted on said pivot handle support, said pivot handle including
            (i) an L-shaped body,
            (ii) a distal end connected to said pivot handle support for movement therewith,
            (iii) a proximal end
            (iv) an elbow located between said distal end and said proximal end, said elbow being located adjacent to said base for abutting engagement with said base,
            (v) said pivot handle being pivotally movable between a first configuration with said proximal end spaced from the associated side edge and a second configuration with said proximal end located adjacent to the associated side edge, said elbow abuttingly engaging said associated side edge to be a pivot location about which said pivot handle pivots in moving between said first position of said pivot handle to said second position of said pivot handle whereby said pivot handle acts like an over-center pivot, and
            (vi) said pivot handle support being in said first position adjacent to said forward edge of said base of said locking unit when said pivot handle is in said first configuration with said proximal end spaced from the associated side edge and being in said second position adjacent to said rear edge of said base of said locking unit when said pivot handle is in said second configuration with said proximal end located adjacent to the associated side edge; and
   c) two spring units, each spring unit connecting an associated locking unit to said towing tractor, each spring unit including
      (1) a spring mount which includes
         (A) first and second U-shaped bodies, each U-shaped body including a base having two outer ends and two spaced apart legs, each leg having a base end fixed to said base of said U-shaped body associated therewith and a distal end spaced from said base of said U-shaped body associated therewith,
         (B) said base end of each leg being spaced from an outer end of said base end associated therewith,
         (C) said first and second U-shaped bodies being oriented with respect to each other such that said bases of said U-shaped bodies are oriented at an oblique angle with respect to each other, and said legs of said first U-shaped body are located between said legs of said second U-shaped body and said legs of said first and second U-shaped bodies are positioned between said bases of said U-shaped bodies,
         (D) said legs of said U-shaped bodies slidably engaging each other as said U-shaped bodies move toward and away from each other,
         (E) a shoulder on each U-shaped body base between each outer end and a leg, and
         (F) a spring supporting foot on said distal end of each leg,
      (2) a hook unit fixedly attached to each base of said U-shaped body,
      (3) a coil spring surrounding each spring mount and having one end positioned to abut said shoulders on both U-shaped body bases, and a second end positioned to abut said spring supporting ends on said legs of said U-shaped bodies as said U-shaped bodies move toward and away from each other with said coil spring resisting sliding movement of said two U-shaped bodies;
   d) a first tie element connecting said hook unit on said first U-shaped body to said towing tractor; and
   e) a second tie element connecting said hook unit on said second U-shaped body to said base of an associated one of said locking units.

2. The stabilizer as described in claim 1 wherein said locking units are oriented to be parallel with each other.

3. The stabilizer as described in claim 2 wherein said shoulders are welded to each U-shaped body base.

4. The stabilizer as described in claim 3 wherein said spring-supporting foot on each leg is welded thereto.

* * * * *